No. 768,148. PATENTED AUG. 23, 1904.
T. B. RENNELL.
VARIABLE SPEED TRANSMISSION GEARING AND CONTROLLING MEANS THEREFOR.
APPLICATION FILED NOV. 30, 1903.
NO MODEL. 4 SHEETS—SHEET 4.
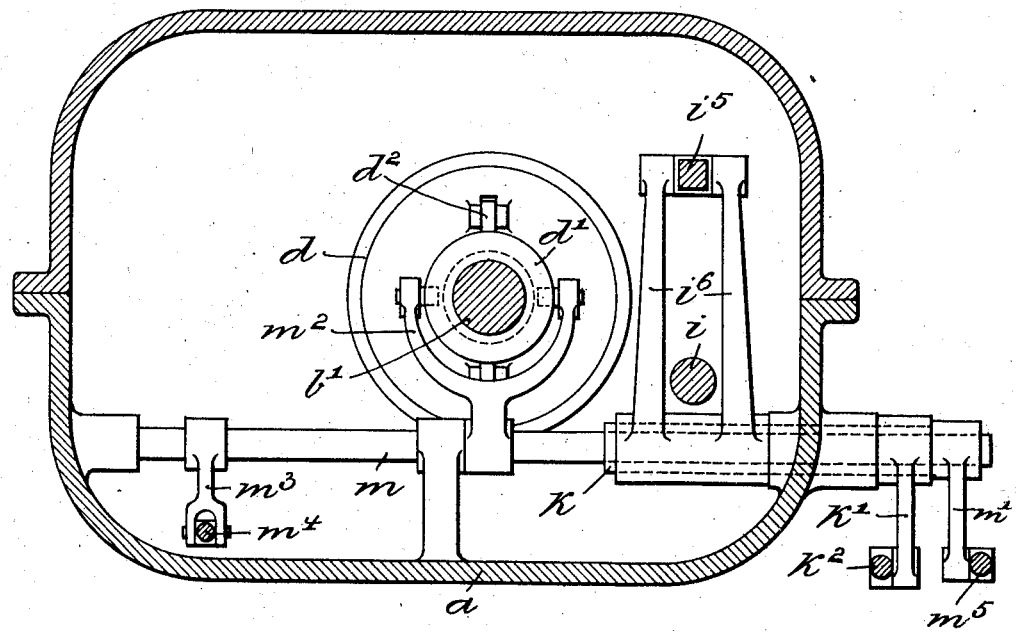
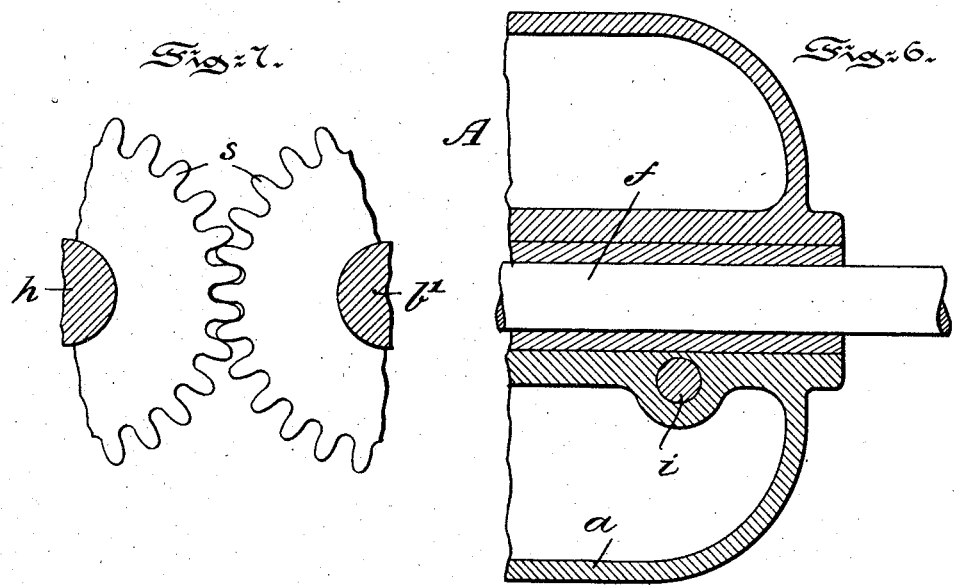
Witnesses:
Wilhelm Vogt
Jas. C. Wobensmith
Inventor:
Thornton B. Rennell,
By J. Walter Douglas
Attorney.

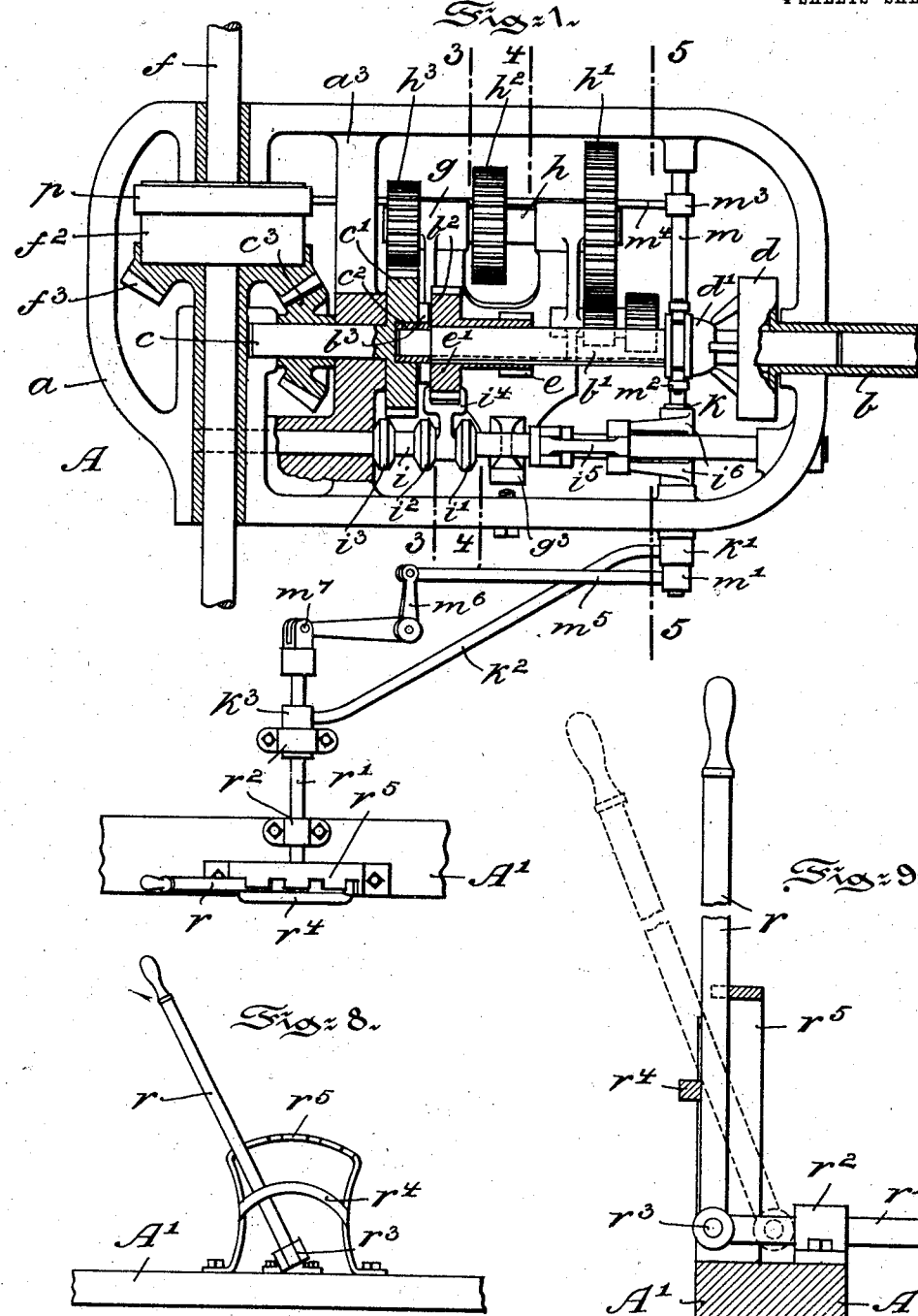

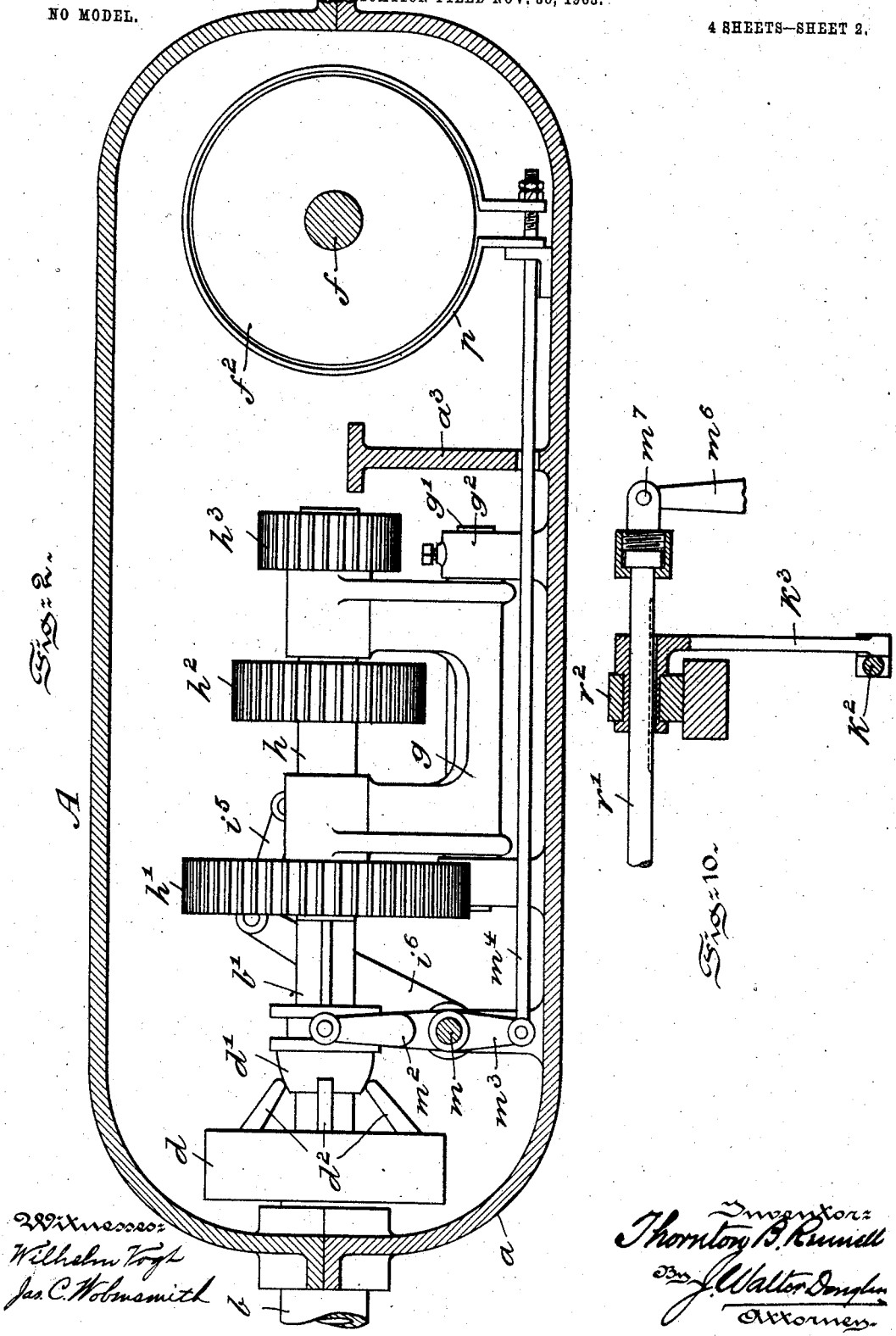

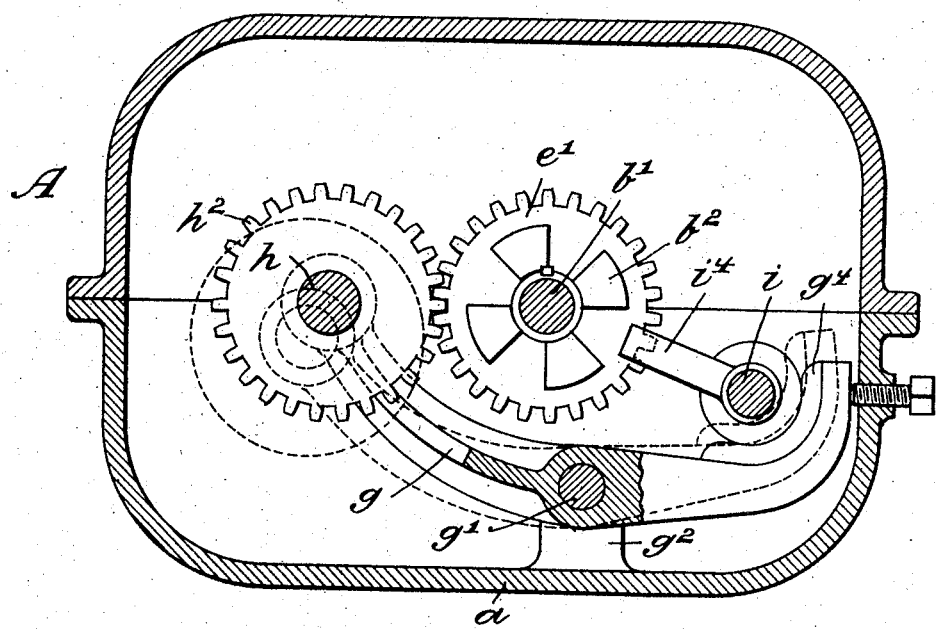
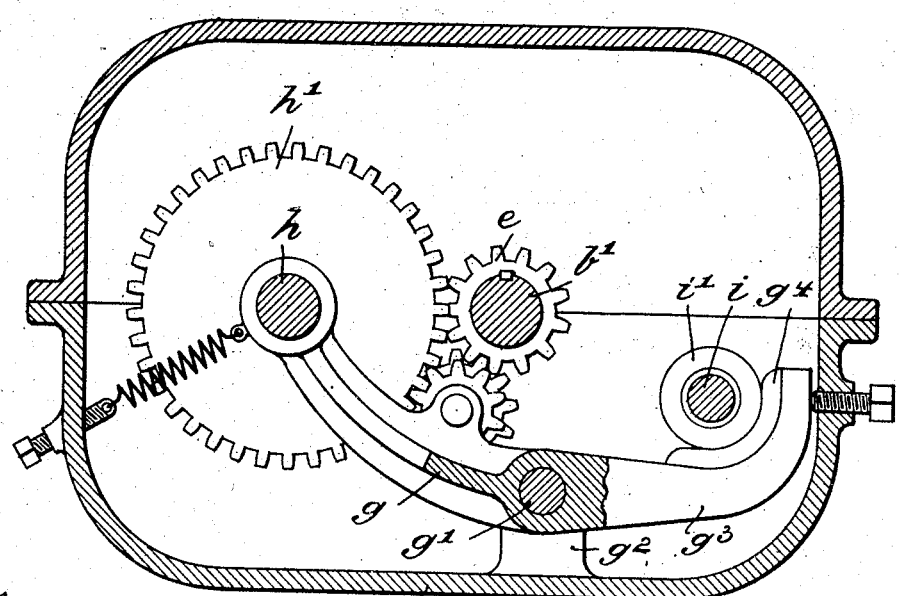

No. 768,148. Patented August 23, 1904.

UNITED STATES PATENT OFFICE.

THORNTON B. RENNELL, OF DENVER, COLORADO.

VARIABLE-SPEED-TRANSMISSION GEARING AND CONTROLLING MEANS THEREFOR.

SPECIFICATION forming part of Letters Patent No. 768,148, dated August 23, 1904.

Application filed November 30, 1903. Serial No. 183,123. (No model.)

*To all whom it may concern:*

Be it known that I, THORNTON B. RENNELL, a citizen of the United States, residing at the city of Denver, in the county of Denver and State of Colorado, have invented certain new and useful Improvements in Variable-Speed-Transmission Gearing and Controlling Means Therefor, of which the following is a specification.

My invention has relation to variable-speed-transmission gearing and controlling means for the same; and in such connection it relates to the general construction and arrangement of such gearing and means for controlling the same.

In a companion application for a patent filed by me under date of July 3, 1903, and serially numbered 164,119, I have described and claimed a variable-speed-transmission gearing consisting, essentially, of the following parts, to wit: a main power-shaft, an auxiliary power-shaft arranged to be coupled directly to or uncoupled from the main shaft, and a transmission-shaft arranged to be coupled directly to or uncoupled from the auxiliary shaft, in combination with gear-wheels splined upon and connected with certain of these shafts, a counter-shaft and gear-wheels arranged thereon, a means for pivotally supporting the counter-shaft and its gear-wheels, and a cam-shaft with cams arranged to oscillate the supporting means to bring certain of the gear-wheels in mesh with certain gear-wheels of the auxiliary and power-transmission shafts.

The principal object of my present invention is to provide a simple and efficient means whereby the coupling and uncoupling of the auxiliary shaft to and from the main shaft may be accomplished, the shifting of the cam-shaft to properly shift the gears of the auxiliary shaft and the oscillation of the counter-shaft may be obtained, and the application of a brake to the driven wheel may be regulated after the auxiliary shaft is uncoupled from the main shaft.

The nature and scope of my invention will be more fully understood from the following description, taken in connection with the accompanying drawings, forming part hereof, in which—

Figure 1 is a top or plan view, partly sectioned, of a variable-speed-transmission gearing and of the means for controlling the same embodying main features of my invention. Fig. 2 is an enlarged view, partly in side elevation and partly in longitudinal section, of the same. Figs. 3 and 4 are enlarged cross-sectional views taken substantially on the lines 3 3 and 4 4, respectively, of Fig. 1. Fig. 5 is an enlarged cross-sectional view taken substantially on the line 5 5 of Fig. 1. Fig. 6 is an enlarged detail view illustrating in section the construction and relative arrangement of the driven shaft and the cam-shaft in the casing for the gearing. Fig. 7 is a detail view illustrating a modified form of gear-wheels wherein the teeth are formed to facilitate the meshing of said wheels. Fig. 8 is an end elevational view of the hand-lever and sector for controlling the variable-speed-transmission gearing and the brake for said gearing. Fig. 9 is an enlarged transverse sectional view of Fig. 8, and Fig. 10 is an enlarged horizontal sectional view illustrating in detail the shaft arranged to be oscillated and to be shifted in and out by the hand-lever.

In the drawings the variable-speed-transmission gearing illustrated is the same as that illustrated in the companion application filed July 3, 1903, under Serial No. 164,119. A description of this gearing follows in detail in order that the construction, arrangement, and operation of the controlling means may be more fully understood. A sectional housing A has its lower section $a$ adapted to be supported upon the running-gear of a motor-vehicle or the framework of an engine or the like. As shown in Fig. 1, in the sectional housing A is arranged at one end a hollow shaft $b$, which is positively driven from any suitable source of power (not shown) and constitutes the main driving-shaft of the gearing. This main driving-shaft $b$ serves to support one end of an auxiliary driving-shaft $b'$, the other end of which engages a bushing $c^2$ of a gear-wheel $c'$, preferably integral with a transmission-shaft $c$, which is arranged in alinement with the main driving-shaft $b$ and auxiliary driving-shaft $b'$ and is supported by a bracket $a^3$, preferably integral with the lower section $a$ of the sectional housing A. The preferred means of connecting and disconnecting the main driving-shaft $b$ from the auxiliary driving-shaft $b'$ consists in a coupling $d$ of well-known construction, which is controlled by a coupling-cone $d'$, sliding on the auxiliary driving-shaft $b'$ and engaging coupling-fingers $d^2$. On the auxiliary shaft $b'$ is slidably arranged a train of gear-wheels $e$ and $e'$, the gear-wheel $e'$ of which is provided with one member of a coupling $b^2$, the other member $b^3$ thereof being integral with the gear-wheel $c'$ of the transmission-shaft $c$. This coupling forms the connecting means between the auxiliary driving-shaft $b'$ and the transmission-shaft $c$, as shown in Fig. 1, which couplings are, however, disconnected from each other as soon as the sliding train of gear-wheels $e$ and $e'$ are shifted toward the right in Fig. 1 for a purpose to be presently more fully explained. The transmission-shaft $c$ is provided with a bevel-gear $c^3$, meshing with a bevel-gear $f^3$, secured to the housing $f^2$ of a differential gearing of well-known construction, which gearing actuates the divided driven shaft $f$ in the usual manner. This arrangement of the shafts $b$, $b'$, and $c$ permits of a direct transmission of a high speed of rotation imparted to the main driving-shaft $b$ to the driven shaft $f$ and from thence to the driving mechanism of the vehicle—for instance, an automobile—where such high speed is most desired without the intervention of an auxiliary driving-shaft and its gearing and without incurring loss in power in such transmission.

Below the auxiliary driving-shaft $b'$ is arranged a bracket $g$, movably supported by a shaft $g'$, carried by brackets $g^2$, preferably integral with the section $a$ of the housing, as shown in Fig. 2. This bracket $g$ carries a shaft $h$, to which are secured gear-wheels $h'$, $h^2$, and $h^3$. The bracket $g$ tapers into an arm $g^3$, provided with a steel shoe $g^4$, which in the position shown in full lines in Fig. 1 and in dotted lines in Fig. 3 rests against a shaft $i$, slidably arranged in the lower section $a$ of the housing A. In this position of the bracket $g$ the gear-wheel $h^3$ thereof, arranged opposite the gear-wheel $c'$ of the transmission-shaft $c$, is held out of engagement therewith and in this manner permits the direct transmission of high speed imparted from the main driving-shaft $b$ to the driven shaft $f$. The sliding shaft $i$ is provided with a series of cam-disks $i'$, $i^2$, and $i^3$, (see Fig. 1,) arranged a certain distance apart from each other and with a bracket $i^4$, adapted to engage the gear-wheel $e'$ of the sliding train of gear-wheels keyed to the auxiliary driving-shaft $b'$. As shown in Figs. 1, 2, and 5, to the shaft $i$ is pivotally secured a link $i^5$, engaged by the lever-arm $i^6$.

So far as described the mechanism is precisely the same as illustrated in my previous application for a patent, Serial No. 164,119. The lever-arm $i^6$ in the present invention is carried by a hollow shaft $k$, which projects through the casing A and is provided with a crank-arm $k'$. The hollow shaft $k$ is traversed by a rock-shaft $m$, having outside the casing A a crank-arm $m'$. Within the casing upon the shaft $m$ is secured a forked arm $m^2$, adapted to couple or uncouple the clutch $d'$ of auxiliary shaft $b'$ with the clutch $d$ of the main shaft $b$, as clearly illustrated in Figs. 1, 2, and 5. The shaft $m$ also has a depending rock-arm $m^3$, connected to one end of a brake-rod $m^4$. The brake-rod $m^4$ at its opposite end is arranged to operate a brake-band $p$, surrounding the housing $f^2$ of a differential gearing (not shown) on the divided driven shaft $f$. The hollow shaft $k$ in its oscillation controls, through the lever-arm $i^6$ and link $i^5$, the shifting of the cam-shaft $i$, and consequently controls, through the bracket $i^4$, the sliding of the gear-wheels $e$ and $e'$ on the shaft $b'$, as well as, through the cams $i'$ $i^2$ $i^3$, the oscillation of the bracket $g$, so as to bring the gears $h'$, $h^2$, and $h^3$ in position to mesh, as desired, respectively, with either of the gears $e$ or $e'$. The oscillation of the shaft $m$ has a twofold function—namely, it first operates the clutch between the shafts $b$ and $b'$ to uncouple or couple said shafts, and through the crank-arm $m^3$ and brake-rod $m^4$ it serves to apply or release the brake-band $p$ to or from the housing $f^2$ of the differential gear on the driven shaft $f$ to either stop the movement of said shaft or to permit of its being driven by the gear mechanism.

One of the main objects of the present invention is to control the rocking or oscillating of both hollow shaft $k$ and shaft $m$ through a single hand-lever $r$. To accompplish this object, the crank-arm $k'$ of the hollow shaft $k$ is connected by a link $k^2$ with a lever-arm $k^3$, splined to a shaft $r'$, as clearly illustrated in Figs. 1 and 10. The crank-arm $m'$ of the shaft $m$ is connected by a link $m^5$ with one end of a bell-crank lever $m^6$, the other end of said bell-crank lever $m^6$ being connected by a swivel-joint $m^7$ with the end of the shaft $r'$. The shaft $r'$ is supported in bearings $r^2$, so as to turn as well as to slide back and forth therein. The hand-lever $r$ at its lower end is connected by a pivotal connection $r^3$ to the shaft $r'$ and is arranged to oscillate between a guard $r^4$ and a notched sector $r^5$, fixed to the framework A' of the vehicle or motor to be driven. The free end of the hand-lever $r$ can be depressed and its inner pivoted end $r^3$ pushed inward, as indicated in dotted lines in Fig. 9, by using the guard $r^4$ as a fulcrum. In normal position the hand-lever $r$ rests in one of the notches of the sector $r^5$, and according to the notch in which it rests the lever $r$ controls the oscillation given to the shaft $r'$, and consequently through the intermediate connections the oscillation given to the hollow shaft $h$ and the shifting movement given to the cam-shaft $i$. In other words, the movement of the lever $r$ from notch to notch controls the connections of the gearing within the casing A. When the lever-arm $r$ is taken out of or placed in a notch, its lower end is shifted inward or outward to shift the shaft $r'$ correspondingly. These movements of the shaft $r'$ will either uncouple or couple the shafts $b'$ and $b$ through the bell-crank lever $m^6$, link $m^5$, crank-arm $m'$, and shaft $m$. A still further movement downward of the free end of the hand-lever $r$, as illustrated in dotted lines in Fig. 9, applies the brake-band $p$ to the housing of the differential gear of the driven shaft $f$.

While in my present invention the throwing in or out of the gears $h'$, $h^2$, and $h^3$ with gears $e$ and $e'$ is preceded by the uncoupling of the shafts $b$ and $b'$, it is not necessary to operate the cam-shaft $i$, and consequently gears $h'$, $h^2$, $h^3$, and $e$ and $e'$, when the brake $p$ is to be applied. On the contrary, after the uncoupling of the two shafts $b$ and $b'$ a continued or further movement of the hand-lever $r$ applies the brake whether the gears $h'$, $h^2$, and $h^3$ and $e$ and $e'$ are in mesh or not.

In Fig. 7 is shown a preferred form of teeth $s$ for the gears on shaft $h$ and shaft $b'$, so that said gears may readily mesh when the shaft $h$ is swung upward by the cam-shaft $i$.

Having thus described the nature and object of my invention, what I claim as new, and desire to secure by Letters Patent, is—

1. In a device of the character described, a main driving-shaft and an auxiliary driving-shaft adapted to be coupled to or uncoupled from each other, variable-speed gears arranged on the auxiliary driving-shaft, a counter-shaft having variable-speed gears arranged to mesh as required with the gears on the auxiliary driving-shaft and means for oscillating said counter-shaft so as to mesh or unmesh said gears, in combination with a hand-lever shaft having an oscillatory and an in-and-out movement in its bearings and mechanism connecting the hand-lever shaft with the counter-shaft and with the means for coupling and uncoupling the main and auxiliary driving-shafts, said mechanism arranged so that the oscillatory movement of the hand-lever shaft controls the oscillatory movement of the counter-shaft and the in-and-out movement of the hand-lever shaft controls the coupling or uncoupling of the main and auxiliary driving-shafts.

2. In a device of the character described, a main driving-shaft and an auxiliary driving-shaft adapted to be coupled to or uncoupled from each other, an oscillatory counter-shaft, variable-speed-transmission gearing controlled by said counter-shaft, a driven shaft and a band-brake controlling the driven shaft, in combination with a hand-lever shaft having an oscillatory and an in-and-out movement in its bearings, and mechanism connecting the hand-lever shaft with respectively the counter-shaft, the coupling and uncoupling means of the main and auxiliary driving-shafts and the band-brake, said mechanism arranged so that the oscillatory movement of the hand-lever shaft controls the oscillation of the counter-shaft and the in-and-out movement of the hand-lever shaft controls successively the coupling or uncoupling of the main and auxiliary driving-shafts and the application of the band-brake to the driven shaft.

In testimony whereof I have hereunto set my signature in the presence of two subscribing witnesses.

THORNTON B. RENNELL.

Witnesses:
  LAURA L. DAVIS,
  ELMER MARSH.